May 14, 1946.    S. G. DOWN ET AL    2,400,399
JOURNAL PROTECTING APPARATUS
Filed March 30, 1944
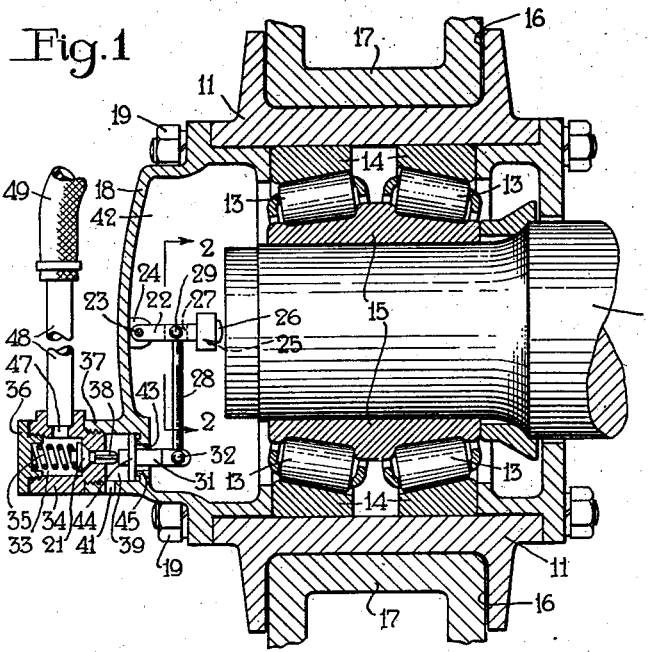
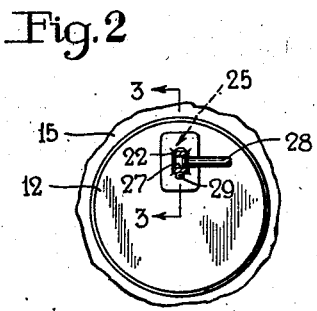
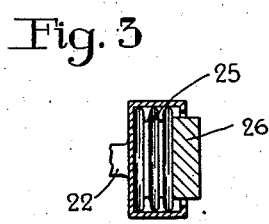
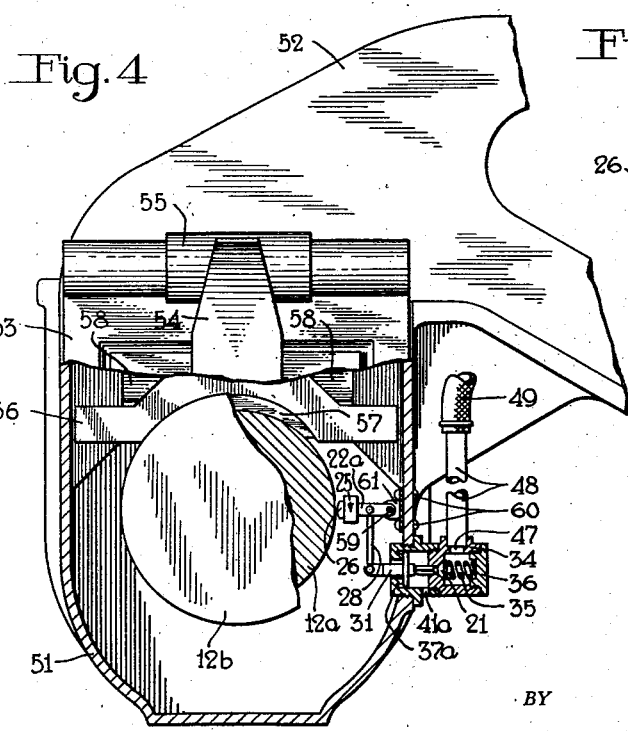
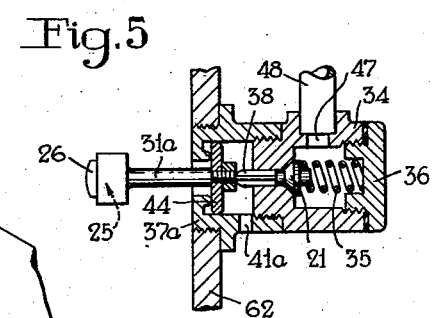
INVENTORS
Sidney G. Down
Frank E. Miller
BY
ATTORNEY Patented May 14, 1946

2,400,399

UNITED STATES PATENT OFFICE 2,400,399

JOURNAL PROTECTING APPARATUS

Sidney G. Down, Edgewood, and Frank E. Miller, Swissvale, Pa., assignors to The Westinghouse Air Brake Company, Wilmerding, Pa., a corporation of Pennsylvania Application March 30, 1944, Serial No. 528,752

8 Claims. (Cl. 246—169)

This invention relates to journal protecting apparatus and has particular relation to apparatus for protecting the axle journals of railway car trucks against damage due to excessive or abnormal heat development therein.

The development of hot boxes, that is, excessive or abnormal heat in axle journals, due usually to inadequate lubrication in the journals, has long been a serious problem to the railroads because of delays incident thereto and possible damage and even wreckage of a train caused by breakage of an axle as a result of the hot box condition.

Various devices have been proposed and in some cases employed for signaling the occurrence of a hot box condition in the axle journals of railway cars and trains and also for effecting an automatic application of the brakes on the train in order to forestall damage and possible wreckage of the train. Such devices have been of mechanical or electrical nature or a combination of mechanical and electrical nature. One of the most common devices employed for detecting the abnormal heat condition in a journal is in the form of a fusible element effective upon melting in response to excessive or abnormal temperature in a journal, to cause a signal or a control operation. There is a disadvantage, however, in employing a fusible element, namely, the need for replacement after it is once melted. This disadvantage to some extent outweighs the advantage of mechanical simplicity inherent in the fusible element.

It is an object of our present invention to provide journal protection apparatus comparable in simplicity of construction and cost to devices including fusible elements, installable with a minimum of time and expense on existing journal casings, and obviating the need for replacement of any part or element following each operation thereof.

More particularly, it is an object of our invention to provide means for rendering the power inherent in a rotating axle effective to cause operation of a control device upon the occurrence of a predetermined or abnormal heat condition in the journal.

A further object of our invention is to provide apparatus of the type indicated in the foregoing object characterized specifically by a thermal-responsive device effective in response to a predetermined heat condition in the journal to establish a frictional contact with the rotating axle in the journal in a manner such that a force is exerted by the axle effective to cause positive operation of a control device.

The above objects, and other objects of our invention which will be made apparent hereinafter, are attained in several embodiments of our invention subsequently to be described and shown in the accompanying drawing, wherein Fig. 1 is a horizontal sectional view through a journal of the roller bearing type such as employed on passenger cars, showing our invention embodied therein, Fig. 2 is a fragmental sectional view, taken on the line 2—2 of Fig. 1, showing in further detail the relation of the parts therein, Fig. 3 is an enlarged sectional view taken on the line 3—3 of Fig. 2, showing details of the thermal-responsive device, Fig. 4 is a fragmental view, partially in section, showing our invention applied to a journal of the type commonly employed in freight cars, and Fig. 5 is a fragmental sectional view showing a modified embodiment of our invention capable of use in connection with either of the types of journals shown in Fig. 1 and Fig. 4.

Description

Referring to Fig. 1, there is shown an axle journal, of the roller bearing type commonly employed on passenger cars, comprising a journal casing or box 11 in which the end of an axle 12 is rotatively supported by roller bearings 13 interposed between two outer bearing races 14 and an inner bearing race 15. The journal casing is provided on opposite exterior sides thereof with grooves or channels 16 for receiving in slidable relation therein the vertically extending pedestal jaws 17 of one end of a side frame member of the car truck. An end cover 18 is attached, as by screws or bolts 19, to the outer end of the journal casing in place of the usual end cover.

The end cover 18 differs slightly from the standard end cover in that it is adapted to carry mechanism, presently to be described, constituting one embodiment of our invention.

The mechanism carried by the end cover 18 comprises a control device, illustrated as a valve 21 of the poppet type, and an actuating member 22 pivoted, as by a pin 23, on a lug 24 formed on or attached to the interior surface of the end cover 18. The free end of the actuating member 22 is suitably formed to receive and hold therein a thermal-responsive device, illustrated as a gas chamber in the form of a flexible bellows or "Sylphon" 25. The outer face of the bellows 25 has secured thereon a contact element 26, preferably made of material having a high coefficient of friction, for engaging the end of the axle 12 at a point displaced from the rotational axis thereof. As shown in Fig. 2, the thermal-responsive device 25 is disposed vertically above the axis of the axle 12 but it will be understood that, if desired, it may be disposed below the axis of the axle or to either side of the axis of the axle.

The actuating member 22 has a slot 27 therein for receiving one end of a link 28 that is pivotally connected to the member 22, as by a pin 29. The opposite end of the link 28 is received in a yoke formed at the end of a toggle member 31 and is pivotally coupled to the toggle member 31, as by a pin 32.

The poppet valve 21 is contained in a chamber 33 formed in a suitable casing member 34 and is yieldingly biased into seated position on a cooperating valve seat, formed on the casing 34, by means of a coil spring 35 interposed between the valve and a screw plug 36 closing the open end of the chamber 33.

The casing 34 is secured to an outwardly extending boss 37 on the outer face of the end cover 18, as by a screw connection in the manner shown, and the end of the fluted stem 38 of the valve 21 abuts the end of the toggle member 31 opposite to that to which the link 28 is coupled. The boss 37 has a chamber 39 formed therein which is constantly open to atmosphere through an exhaust port 41 and to the chamber 42, formed on the interior of the journal casing through an opening or slot 43 through which the toggle member 31 extends.

The toggle member 31 has an annular collar or washer 44, fixed thereon or integral therewith, which closely fits in and conforms to the configuration of the wall of the chamber 39 and seats on an annular rib 45 formed on the boss 37 and surrounding the opening 43 inside the chamber 39.

Communicating with chamber 33 through a port 47 is a short length of pipe 48 that is attached as by a screw connection to the casing 34. A flexible tube or conduit 49, suitably attached to the end of the pipe 48, leads to any device which it is desired to control, such as the brake pipe on the train.

*Operation*

Let it be assumed that the journal shown in Fig. 1 is at its normal operating temperature. In such case, the contact element 26 on the flexible bellows 25 is retracted out of engagement with the end surface on the axle 12. The poppet valve 21 is accordingly seated by the spring 35. There is a slight lost motion of toggle member 31 between the end of the fluted stem 38 of the valve 21 and the annular rib 45 in order to insure proper seating of the valve 21. The end of the fluted stem 38 is thus effective to hold the collar 44 of toggle member 31 in close relation to the annular rib 45 so that the actuating member 22 is substantially in parallel relation to the rotational axis of the axle 12. This is the condition of the parts of the mechanism so long as the temperature within the journal does not rise to an abnormal degree above the normal temperature in the journal. It will be noted that by reason of the flat side of the actuating member 22 engaging the horizontal flat surface of the lug 24, the vertical inertia forces acting on the member 22 are not transmitted through the link 28 in a direction which may cause undesired unseating of the valve 21.

When the temperature within the journal rises to a point approaching an abnormally high value, indicative of the hot box condition, the expansion of the flexible bellows 25 due to the expansion of the gas or vaporization of liquid therein causes the contact element 26 to frictionally engage the outer end surface of the axle 12. Upon such engagement of the contact element 26 with the end of the axle 12, a force is exerted due to the rotation of the axle which is effective to shift the actuating member 22 pivotally in one direction or the other direction from its normal centered position, depending upon the direction of rotation of the axle 12.

The movement of the actuating member 22 is transmitted through the link 28 to the toggle member 31, which rocks or fulcrums at the point of contact of the collar 44 with the annular rib 45, thereby moving sufficiently in a longitudinal direction to effect unseating of the poppet valve 21. When so unseated, the valve 21 is effective to vent fluid under pressure from the pipe 49 and consequently from the control device or brake pipe connected thereto to atmosphere by way of the exhaust port 41. At the same time, some of the air escaping past the valve 21 flows through the slot 43 into the chamber 42 inside the journal casing and tends, to some extent, to reduce the temperature of the journal.

For purposes of the present application it will be assumed that the pipe 49 is connected to the brake pipe of a train. In such case, it will be apparent that due to the limited rate at which fluid under pressure is supplied to charge the brake pipe through the feed valve in the running position of the engineer's brake valve and the relatively greater rate at which fluid under pressure is vented from the brake pipe past the valve 21, the pressure in the brake pipe will be reduced at a sufficient rate to initiate an application of the brakes on the train. Upon sensing the application of the brakes on the train, through no act of his own, the engineer will have positive notice of the occurrence of a hot box condition and will promptly operate the brake valve to its application or lap position, thereby terminating further charging of the brake pipe and preventing depletion of the main reservoir and unnecessary operation of the compressor supplying compressed fluid thereto. With the train thus brought to a stop, the crew of the train may then take the necessary steps to correct the hot box condition. Obviously, the apparatus will be sensitive to a heat condition in the journal providing a sufficient factor of safety with respect to a heat condition sufficiently high to cause damage or injury to the journal.

The crew of the train may accelerate the restoration of the journal having the abnormal heat condition to its normal temperature by removing the end cover 18. In such case, the force actuating the valve 21 to unseated position will be removed and the valve 21 will be restored at once to its seated position by the return spring 35. It will thus be possible for the engineer to recharge the brake pipe, if he so desires, while the journal is being cooled.

The end cover 18 may be replaced in a relatively short time because the removal of the thermal-responsive bellows 25 from the journal casing will accelerate the restoration of contact element 26 to its normal retracted position. Upon replacement of the end cover 18, the supply of oil in the journal may be replenished so as to prevent recurrence of the hot box condition upon subsequent travel of the train.

The engineer may wait a certain additional interval of time to insure the reduction of the temperature in the previously abnormally heated journal to a sufficiently low temperature that the contact element 26 of the thermal-responsive bellows 25 will remain disengaged from the end of the axle. Obviously, if the journal is not sufficiently cooled following replacement of the end cover 18 to insure disengagement of the contact element 26 from the end of the axle, subsequent starting of the train will cause immediate unseating of the valve 21 and a repetition of the brake application in the manner just described.

It is possible that the crew of the train may correct an abnormal heat condition in the journal merely by adding a supply of lubricating oil thereto through the usual filling opening (not shown) without removing the end cover 18. In such case, however, it is necessary to wait a sufficient length of time for the valve 21 to be reseated in response to the contraction of the thermal-responsive bellows 25 sufficiently to disengage the contact element 26 from the end of the axle 12, before recharging of the brake pipe can be effected and the consequent release of the brakes on the train effected.

The delay incidental to the hot box condition may thus be minimized by removal of the end cover 18 in the manner previously described.

We prefer to dispose the actuating member 22 substantially in a vertical line above or below the axis of rotation of the axle 12 for the reason that the vibration of the member 22 in a vertical direction due to inertia forces set up in response to road shock is in a vertical direction and is not thereby transmitted through the horizontally disposed link 28 in a manner tending to unseat the valve 21. If desired, however, the actuating member 22 may be located at the level of the rotational axis of the axle 12 on either side thereof. In such case the connecting link 28 extends in a vertical direction and the inertia forces acting on the actuating member are thus transmitted to the valve 21 and have a tendency to cause unseating thereof. By providing a sufficiently strong return spring 35 for the valve 21, such undesired unseating of the valve 21 will, however, be prevented. Adequate power is, in any case, available to shift the actuating member 22 upon frictional engagement of the contact element 26 with the end of the axle so as to effect positive unseating of the valve 21 regardless of the resisting force of the return spring 35 associated with the valve.

Figure 4

Referring to Fig. 4, there is shown a friction type of journal, commonly employed on freight cars, in which the journal casing or box 51 is formed integral with the truck side frame 52. The view in Fig. 4 is from a point looking toward the end of the axle, a portion of the journal lid 53 being broken away for clarity. The customary spring 54 on the lid cooperates with a cam 55 on the journal casing for alternatively holding the lid in shut or open position.

In this type of journal a bearing member 56 having a Babbitt liner 57 engages the upper portion of the axle 12a; and the customary wedge 58 is locked in the journal casing in a manner to hold the bearing member 56 against rotation with the axle 12a. In this type of journal the axle 12a is customarily provided with an end flange 12b.

The journal protective apparatus shown in Fig. 4 is substantially identical in construction to that previously described in connection with Fig. 1 and it is deemed sufficient, therefore, to designate the corresponding elements by the same reference numerals as in Fig. 1, pointing out only the differences in construction and arrangement.

The actuating arm 22 in the journal shown in Fig. 4 is pivoted on a pin 59 secured in a lug 61 attached, as by rivets 60, to the interior surface of the side wall of the journal casing 51 substantially at the level of the axis of the axle 12a. The valve casing 34 is secured as by a screw connection to a tubular casing section 37a that is, in turn, screwed into a threaded bore in the side wall of the journal casing 51. The casing member 37a is provided with an exhaust port 41a corresponding to the exhaust port 41 in Fig. 1.

The operation of the embodiment shown in Fig. 4 will be apparent from the previously described operation of the embodiment shown in Fig. 1, there being no difference except that the contact element 26 of the thermal-responsive bellows 25 is effective upon expansion to frictionally engage the circumferential surface of the axle instead of the end surface thereof. As in the first described embodiment, the operation of the mechanism is effected whenever an abnormal heat condition occurs in the journal, whether the axle rotates in one direction or the opposite direction.

Figure 5

Referring to Fig. 5, a modified construction is shown wherein the link 28 is eliminated and the thermal-responsive bellows 25 is carried on the end of a toggle member 31a corresponding to the toggle member 31. This embodiment is applicable to either the roller bearing type journal shown in Fig. 1 or the friction type journal shown in Fig. 4. In the case of the roller bearing type journal, the support 62 corresponds to the end cover 18 whereas in the friction type journal shown in Fig. 4 the support 62 represents the side wall of the journal casing 51. Dimensions of the parts of this embodiment may be varied, of course, to adapt the mechanism to different types of journals.

No further description of this embodiment is deemed necessary since the parts are designated by the same reference numerals as in previous embodiments and function in a corresponding manner.

It will be apparent that all of the embodiments of our invention may be installed and applied on standard journals without requiring more than replacement of the end cover, as in Fig. 1, or drilling or boring of the journal casing or end cover as in Fig. 4 and Fig. 5.

It is not our intention to limit the scope of our invention to the exact construction shown for the reason that equivalent structural elements may be employed without departing from the terms of the appended claims. Thus for the purposes of our present invention it is immaterial whether a valve, corresponding to the valve 21, or a switch be employed. Furthermore, the exact type of thermal-responsive device performing the function of the thermal-responsive bellows 25 is immaterial, it being possible to employ a device of bimetallic nature in place of the bellows.

Having now described our invention, what we claim as new and desire to secure by Letters Patent, is:

1. Apparatus for protecting a journal, having a shaft rotatable therein, against the effects of an abnormal heat condition in the journal, said apparatus comprising a control device, a member movable to actuate said control device, and thermal-responsive means carried by said movable member and effective only upon the occurrence of an abnormal heat condition in the journal for establishing a connection between said member and said shaft in such a manner as to cause movement of said movable member in response to rotation of the shaft.

2. Apparatus for protecting a journal, having a casing and a shaft rotatable therein, against the effects of an abnormal heat condition therein, said apparatus comprising a control device supported by the journal casing, a movable member carried by the journal casing and effective upon movement thereof to operate said control device, and thermal-responsive means carried by the said movable member and effective to establish frictional contact with the rotating shaft only upon the occurrence of an abnormal heat condition in the journal, so as to render the rotation of the shaft effective to cause movement of the said member.

3. Apparatus for protecting a journal, having a shaft rotatable therein, against the effects of an abnormal heat condition therein, said apparatus comprising a control device, a pivoted actuating member, thermal-responsive means carried by said actuating member for establishing frictional contact with the shaft in a manner to cause movement of the actuating member in either direction from a normal position, depending upon the direction of rotation of the shaft, only upon the occurrence of an abnormal heat condition in the journal, and means interposed between said actuating member and said control device for effecting operation of said control device in response to pivotal movement of the actuating member in either direction from its normal position.

4. Apparatus for protecting a journal, having a shaft rotatable therein, against the effects of an abnormal heat condition in the journal, said apparatus comprising a control device, a toggle member rockable in any direction out of a normal centered position to effect operation of the control device, and thermal-responsive means carried by said toggle member and effective upon the occurrence of an abnormal heat condition in the journal for establishing frictional contact with the axle in a manner to cause rocking movement of said toggle member out of its normal position.

5. In an axle journal for a railway car truck of the type having a removable end cover, the combination of a control device carried by the end cover, a rockable member carried by and cooperating with the end cover in such a manner as to cause operation of the control device in response to rocking movement in any direction out of a normal centered position, and thermal-responsive means carried by the rockable member and effective upon the occurrence of an abnormal heat condition in the journal to establish a frictional connection with the axle whereby rotation of the axle causes rocking of the rockable member out of its normal position.

6. In an axle journal for a railway car truck of the type having a removable end cover, the combination of a control device carried by the end cover, an actuating member for said control device pivoted on the end cover and extending axially toward the end of the axle, thermal-responsive means carried by the actuating member for establishing a frictional contact between the actuating member and a point on the end of the axle radially displaced from the axis of rotation of the axle thereby to cause pivotal movement of the actuating member in either direction from a normal centered position depending upon the direction of rotation of the axle, whenever an abnormal heat condition occurs in the journal, and means interposed between the actuating member and the control device for effecting operation of the control device in response to pivotal movement of said actuating member in either direction from its normal centered position.

7. In an axle journal for a railway car truck, which journal has a casing sidewall substantially parallel to the axis of rotation of the axle, a control device carried by the casing sidewall, a pivoted member carried by the casing sidewall, said member having a normal centered position in which the control device is in a non-operated position and pivotally movable in either direction out of its normal position to effect operation of the control device, and thermal-responsive means carried by the pivoted member for establishing a frictional contact between the pivoted member and the peripheral surface of the axle only when an abnormal heat condition exists in the journal, thereby to effect movement of said member out of its normal position.

8. In an axle journal for a railway car truck, the combination of a control device having a casing removably supported by the journal in spaced relation to the axle, a rockable member carried by the casing and cooperating therewith in a manner to effect operation of the control device upon rockable movement out of a normal centered position, and thermal-responsive means carried by the rockable member and effective to frictionally contact the axle upon the occurrence of an abnormal heat condition in the journal, in such manner as to cause a force to be exerted by rotation of the axle to displace the rockable member out of its normal centered position.

SIDNEY G. DOWN.
FRANK E. MILLER.